(12) United States Patent
Li et al.

(10) Patent No.: US 12,283,065 B1
(45) Date of Patent: Apr. 22, 2025

(54) METHOD AND SYSTEM FOR 3D CONTOUR RECONSTRUCTION OF AM PARTS BASED ON LIGHT FIELD IMAGING

(71) Applicant: WUHAN UNIVERSITY, Hubei (CN)

(72) Inventors: Hui Li, Hubei (CN); Xiuhua Li, Hubei (CN); Shengnan Shen, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/938,276

(22) Filed: Nov. 6, 2024

(30) Foreign Application Priority Data

Nov. 14, 2023 (CN) .......................... 202311510142.8

(51) Int. Cl.
   *G06T 7/557* (2017.01)
   *B22F 10/31* (2021.01)
   (Continued)

(52) U.S. Cl.
   CPC .............. *G06T 7/557* (2017.01); *B22F 10/31* (2021.01); *B22F 10/80* (2021.01); *B33Y 50/00* (2014.12);
   (Continued)

(58) Field of Classification Search
   CPC ......... B33Y 50/00; B33Y 50/02; G06T 17/00; G06V 10/44; G06V 10/82; G06N 3/0464
   See application file for complete search history.

(56) References Cited

U.S. PATENT DOCUMENTS

| | | |
|---|---|---|
| 11,450,017 B1 | 9/2022 | Fang et al. |
| 2019/0279051 A1 | 9/2019 | Martinello et al. |
| 2020/0160497 A1* | 5/2020 | Shah ...................... H04N 23/56 |
| 2021/0318673 A1* | 10/2021 | Kitchen ............... G05B 13/048 |

(Continued)

FOREIGN PATENT DOCUMENTS

| | | |
|---|---|---|
| CN | 107295327 | 10/2017 |
| CN | 110443882 | 11/2019 |

(Continued)

OTHER PUBLICATIONS

Wu, Meirui et al., "Structured Illumination Fluorescence Microscopy: Diffraction-Limit Breaking Principle and Application in Life Science", Laser & Optoelectronics Progress, vol. 52, Issue 01, Jan. 10, 2015, with English translation thereof, pp. 1-27.

*Primary Examiner* — Jayanti K Patel
*Assistant Examiner* — Christopher Kingsbury Glover
(74) *Attorney, Agent, or Firm* — JCIP GLOBAL INC.

(57) ABSTRACT

A method and system for 3D contour reconstruction of AM parts based on light field imaging, belonging to the field of image reconstruction technology is provided. The method includes constructing an EPI-UNet framework, where a preset light field dataset is used to construct a training set, learning labels from the disparity maps corresponding to the preset light field dataset are obtained, and EPI-UNet framework is trained to obtain a predicted disparity vector with the training set and learning labels. Two mappings including disparity and depth mapping, and disparity and 3D mapping, are established to get 3D contour of the AM part. The experiments of validation for accuracy and 3D contour reconstruction of AM parts were performed. By applying light field multi-view vision to the AM process and combining the rich angle and spatial domain view information of the light field, this disclosure provides a reliable quality assurance for AM monitoring.

7 Claims, 10 Drawing Sheets

(51) Int. Cl.
  *B22F 10/80* (2021.01)
  *B33Y 50/00* (2015.01)
  *G06T 7/00* (2017.01)
  *G06T 7/80* (2017.01)
  *H04N 13/271* (2018.01)
  *H04N 13/282* (2018.01)

(52) U.S. Cl.
  CPC .............. *G06T 7/0004* (2013.01); *G06T 7/80* (2017.01); *H04N 13/271* (2018.05); *H04N 13/282* (2018.05); *G06T 2207/10052* (2013.01); *G06T 2207/20081* (2013.01); *G06T 2207/20084* (2013.01); *G06T 2207/30144* (2013.01)

(56) References Cited

U.S. PATENT DOCUMENTS

| | | | |
|---|---|---|---|
| 2022/0051471 A1 | 2/2022 | Logothetis et al. | |
| 2022/0134435 A1* | 5/2022 | Scime | G06T 7/11 264/112 |
| 2022/0156430 A1* | 5/2022 | Lambourne | G06F 30/17 |
| 2023/0256513 A1* | 8/2023 | Totzeck | B33Y 30/00 |
| 2023/0289989 A1 | 9/2023 | Yang et al. | |

FOREIGN PATENT DOCUMENTS

| | | |
|---|---|---|
| CN | 112906833 | 6/2021 |
| CN | 115100352 | 9/2022 |
| CN | 115830406 | 3/2023 |
| CN | 116168067 | 5/2023 |
| CN | 116630389 | 8/2023 |
| CN | 116645476 | 8/2023 |

\* cited by examiner

METHOD AND SYSTEM FOR 3D CONTOUR RECONSTRUCTION OF AM PARTS BASED ON LIGHT FIELD IMAGING

CROSS-REFERENCE TO RELATED APPLICATION

This application claims the priority benefit of China Application Serial Number 202311510142.8, filed on Nov. 14, 2023. The entirety of the above-mentioned patent application is hereby incorporated by reference and made a part of this specification.

BACKGROUND

Technical Field

The present disclosure belongs to technical field of image processing, and relates to a three-dimensional (3D) reconstruction, particularly relates to a method a method and system for 3D contour reconstruction of additive manufacturing (AM) parts based on light field imaging.

Description of Related Art

In the process of metal AM, certain key process variables, such as powder layer thickness and surface contour of the parts, can indicate the quality of the part. Rapid monitoring of these critical variables is a mainstream method for addressing metallurgical defects and regulating shape and form. Current mainstream methods such as high-speed cameras and binocular cameras are usually used to perform online monitoring of key variables during the manufacturing process. The obtained online monitoring information is then quickly processed in real time using methods of image and signal processing, as well as artificial intelligence (AI), to monitor characteristic information in the AM process.

Part surface information during the AM process can be quickly captured by high-speed cameras. However, it cannot reconstruct the powder layer or part surface contour with a single exposure due to lack of angular information. Binocular cameras can provide two perspectives during the AM process, and 3D reconstruction algorithms can be used to obtain the powder layer and part morphology. However, this method requires a complex pre-calibration process, and if the camera position changes, re-calibration is necessary, limiting the real-time monitoring of AM.

Currently, AI offers new approaches for reconstructing the powder layer and part morphology during AM, but these algorithms require large training datasets and complex manual labeling processes, further restricting the application of AI in the 3D contour reconstruction and monitoring of AM.

Therefore, developing a method that combines multi-view vision and AI for the rapid 3D contour reconstruction of the powder layer and the surface of the parts in the AM process is of significant importance. Presently, multi-view vision monitoring is limited to traditional stereo matching algorithms with binocular vision. The application of AI methods based on multi-view vision for monitoring the AM process has yet to be developed. Thus, further research into light field multi-view vision with AI algorithms for the 3D contour reconstruction of the powder layer and workpiece in metal AM holds substantial value.

SUMMARY

The present disclosure provides a method and system for 3D contour reconstruction of AM parts based on light field imaging, aimed at addressing the limitations of traditional binocular stereo matching methods in metal additive contour reconstruction, which are constrained by calibration processes and position information.

In the first aspect, the present disclosure provides a method for 3D contour reconstruction of additive manufacturing (AM) parts based on light field imaging, comprising:
  calibrating a light field camera to determine an equivalent calibrated parameter set of a light field camera;
  constructing an epipolar-plane-image UNet (EPI-UNet) framework, using a preset light field dataset to construct a training set, obtaining learning labels from disparity maps corresponding to the preset light field dataset, and training the EPI-UNet framework with the training set and the learning labels to obtain a predicted disparity vector model;
  capturing light field information of an AM part surface of a target to be tested using the light field camera, and obtaining a two-dimensional disparity map of the scene by inputting the light field information into the predicted disparity vector model;
  determining geometric optical path relationship between disparity and depth based on the equivalent calibrated parameter set of the light field camera to obtain the 3D coordinate information of the target to be tested; and
  performing disparity mapping on the 3D coordinate information of the target to be tested to obtain 3D contour information of the target to be tested.

In the second aspect, the present disclosure provides a system for 3D contour reconstruction of AM parts based on light field imaging, comprising:
  a calibration module, configured to calibrate a light field camera to determine an equivalent calibrated parameter set of a light field camera;
  a training module, configured to construct an EPI-UNet framework, use a preset light field dataset to construct a training set, obtain learning labels from disparity maps corresponding to the preset light field dataset, and train the EPI-UNet framework with the training set and the learning labels to obtain a predicted disparity vector model;
  a disparity module, configured to capture light field information of an AM part surface using the light field camera, and obtain the two-dimensional disparity map of the scene by inputting the light field information into the predicted disparity vector model;
  a depth module, configured to determine geometric optical path relationship between disparity and depth based on the equivalent calibrated parameter set of the light field camera to obtain the 3D coordinate information of the target to be tested;
  a mapping module, configured to perform disparity mapping on the 3D coordinate information of the target to be tested to obtain 3D contour information of the target to be tested.

In the third aspect, the present disclosure provides an electronic device, comprising a memory, a processor, and a computer program stored in the memory and executable on the processor, wherein the processor executes the computer program to implement the method for 3D contour reconstruction of AM parts based on light field imaging according to the method.

In the first aspect, the method including following steps:
  Step 1: the light field camera is calibrated to obtain its equivalent focal length and pixel size.
  Step 2: an EPI-UNet framework is constructed. A preset light field dataset is used to build a training set and learning labels are obtained from disparity maps corresponding to the preset light field dataset. The EPI-UNet is trained using the training set and learning labels to obtain a predicted disparity vector.

Step 3: the light field camera is used to capture the light field information of the AM parts, and obtain a two-dimensional disparity map.

Step 4: the geometric optical path relationship between disparity and depth based on the equivalent focal distance of the light field camera is constructed to obtain the 3D coordinate information of AM parts.

Step 5: the disparity of the 3D coordinate information is mapped to obtain the 3D contour information of the AM parts.

The method for 3D contour reconstruction of AM parts based on light field imaging, provided by the present disclosure, includes calibrating the light field camera to obtain an equivalent focal length and pixel values for the light field camera, which involves:

1. Raw Image of standard circular calibration plates are captured by light field camera, and sub-aperture images are extracted from raw Image.
2. Effective focal length and pixel size of the equivalent camera array are obtained from the sub-aperture images.

According to the first aspect, the method for three-dimensional contour reconstruction of AM parts based on light field imaging, characterized by constructing an EPI-UNet network, comprising:

1. An EPI-UNet framework including a contour feature extraction sub-network, a local feature extraction sub-network, and a detail feature extraction sub-network connected in sequence is designed.
2. The contour feature extraction sub-network consists of 5×5×32 convolution kernels, residual modules, 5×5×64 convolution kernels, residual modules, and 5×5×64 convolution kernels.
3. The local feature extraction sub-network consists of 3×3×32 convolution kernels, residual modules, 3×3×64 convolution kernels, residual modules, and 3×3×64 convolution kernels.
4. The detail feature extraction sub-network consists of 2×2×32 convolution kernels, 2×2×16 convolution kernels, and 2×2×1 convolution kernels.

According to the first aspect, using a preset light field dataset to build a training set, obtaining learning labels from disparity maps corresponding to the preset light field dataset is included in the method, which involves:

1. Extracting multiple sub-view images from the preset light field dataset and stacking these sub-view images to form a four-dimensional light field volume.
2. Slicing the four-dimensional light field volume horizontally and vertically, and obtaining the LF-EPI (light field epipolar-plane-image) through gray scaling and contrast-limited adaptive histogram equalization (CLAHE).
3. Dividing multiple LF-EPIs in the preset light field dataset into training and testing sets according to a preset ratio.
4. Extracting vectors from the true disparity maps corresponding to the preset light field dataset as learning labels.

Furthermore, according to the first aspect, the method includes training the EPI-UNet framework using the training set and learning labels to obtain a predicted disparity vector model, which involves:

1. Inputting the training set into the EPI-UNet framework to obtain predicted disparity vectors.

2. Calculating the difference between the predicted disparity vectors and the learning labels using a preset loss function.
3. Backpropagating the difference values, and after completing a training cycle, inputting the testing set into the trained EPI-UNet framework for accuracy testing.
4. Repeatedly adjusting the hyperparameters of the EPI-UNet framework for iterative training until the preset loss function is less than the loss threshold, or the number of training iterations reaches the training iteration threshold, then stopping the training and outputting the predicted disparity vector model.

According to the first aspect, the method also includes using the light field camera to capture the light field information of the AM part surface and obtaining its two-dimensional disparity map, which involves:

1. Slicing the light field information of AM part to obtain LF-EPI, and inputting the LF-EPI into the predicted disparity vector model to obtain multiple one-dimensional disparity vectors.
2. LF-EPIs consist of numbers of lateral and vertical views, and each LF-EPI establishes a lateral and vertical two-dimensional coordinate system. The reciprocal of texture slope of each LF-EPI is equal to the one-dimensional disparity vectors;
3. Sequentially stitching the multiple one-dimensional disparity vectors together to obtain the two-dimensional disparity map of a scene.

According to the first aspect, the method also includes determining the geometric optical path relationship between disparity and depth based on the equivalent focal length and pixels size of the light field camera to obtain the 3D coordinate information of the AM part, which involves:

1. For any point P on the target to be tested, imaging onto the sensor plane through the main lens plane of any two adjacent views, with imaging points being $p_i$ and $p_{i+1}$, respectively;
2. Connecting P with $p_i$ and P with $p_{i+1}$, and intersecting with the symmetrical plane of the sensor plane about the main lens plane at $p_i'$ and $p_{i+1}'$, respectively, to obtain the 3D coordinate information.

$$z' = \frac{B*b}{|x_1 - x_2|} \quad (1)$$

where z represents the distance between the object surface of the target to be tested and the main lens plane, i.e., the depth. B represents the central distance between any two adjacent views, and $x_1$ and $x_2$ represent the distances from the intersection line to the central lines of any two adjacent views, respectively. Let the disparity $\Delta x' = |x_1 - x_2|$, then:

$$z' = \frac{B*b}{\Delta x'} \quad (2)$$

Let F be the focal length of the camera. According to the Gaussian imaging formula: $1/b + 1/z' = 1/F$, substituting it into the Eq. (2), we get:

$$z' - F = \frac{B*F}{\Delta x'} \quad (3)$$

when $z' \to \infty$, $\Delta x' \to 0$, for the conjugate focal plane of the sensor plane, the Gaussian imaging formula becomes: $1/b_0+1/z_0=1/F$, the Eq. (2) can be rewritten as:

$$z_0 = \frac{B*b_0}{\Delta x_0} \quad (4)$$

where $b_0$ is the distance from the main lens plane to the sensor plane. Let D be the aperture diameter of the main lens, and N×N be the number of light field views. Then, the spacing between each view is D/N. According to the geometric relationship, we get:

$$|p_{i+1} - p_i| = \frac{D*(z+l)}{N*z} \quad (5)$$

According to the Gaussian imaging formula: $1/l+1/z_0=1/F$, where $z_0$ is the conjugate distance of l, and $|p_{i+1}-p_i|$ includes the offset $\Delta x_0$ between the disparity obtained by the light field camera and the disparity of its equivalent multi-camera array, the disparity $\Delta x$ of the light field can be derived:

$$\Delta x_0 = \frac{D*(z_0+l)}{N*z_0} \quad (6)$$

$$\Delta x = |p_{i+1} - p_i| - \Delta x_0$$

$$\Delta x = \frac{D*l*\left|\frac{1}{z}-1\right|}{N*z_0}$$

According to the first aspect, the method for 3D contour reconstruction of AM parts based on light field imaging comprises mapping the disparity of the 3D coordinate information of the AM part to obtain the 3D contour information, including:

Based on any point P on the target to be tested, the pixel coordinate system $(X_p, Y_p)$ and the image coordinate system $(X_I, Y_I)$ are determined, where the axes of the image coordinate system are parallel to those of the pixel coordinate system.

The camera coordinate system $(X_c, Y_c, Z)$ and the world coordinate system $(X_w, Y_w, Z)$ are established with the camera optical axis as coordinate origin, where the camera coordinate system and the world coordinate system project their Z-direction coordinate axes parallel to the image coordinate system. Based on the relationship of $z'=B*b/\Delta x'$ and geometry similarity, it can be derived:

$$\begin{cases} \frac{x_I - x_{Io}}{b} = \frac{x_w}{z_w} \\ \frac{y_I - y_{Io}}{b} = \frac{y_w}{z_w} \end{cases} \Rightarrow \begin{cases} x_w = \frac{x_I - x_{Io}}{b} z_w = \frac{x_I - x_{Io}}{\Delta x}*B \\ y_w = \frac{y_I - y_{Io}}{b} z_w = \frac{y_I - y_{Io}}{\Delta x}*B \end{cases} \quad (7)$$

where $(x_{Io}, y_{Io})$ represents the origin of the image coordinate system, the mapping relationship of any pixel in the image coordinate system to the pixel coordinate system is:

$$\begin{cases} x_p = \frac{x_I}{dx} + x_{po} \\ y_p = \frac{y_I}{dy} + y_{po} \end{cases} \Rightarrow \begin{bmatrix} x_I \\ y_I \\ 1 \end{bmatrix} = \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p \\ y_p \\ 1 \end{bmatrix} \quad (8)$$

where $(x_{po}, y_{po})$ is the origin of the pixel coordinate system, and dx and dy are the physical dimensions of a single pixel in the x and y directions respectively. Combining Eq. (7) and (8), the 3D contour information of the target to be tested is obtained as follows:

$$\begin{bmatrix} x_w \\ y_w \\ 0 \end{bmatrix} = \begin{cases} \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * B/\Delta x \\ \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * \left(\frac{z_w}{F}-1\right) \end{cases} \quad (9)$$

In the second aspect, the present disclosure provides a 3D contour reconstruction system for AM parts based on light field imaging, comprising:
1. A calibration module for obtaining the equivalent length and pixel size of the light field camera.
2. A training module for constructing EPI-UNet framework. A preset light field dataset is utilized to build a training set. Learning labels from the corresponding disparity maps of the preset light field dataset are acquired and the EPI-UNet framework using the training set and learning labels are trained to obtain a predicted disparity vector.
3. A disparity module for capturing surface light field information of the target to be tested using the light field camera and deriving two-dimensional disparity maps of parts from this information.
4. A depth module for establishing the geometric optical path relationship between disparity and depth based on the calibrated parameters, thereby obtaining depth information of the target to be tested.
5. A 3D mapping module for mapping the 3D coordinate information of the target to be tested based on disparity to obtain 3D contour information.

The 3D contour reconstruction method and system based on light field imaging provided by the disclosure applies light field multi-view visualization to AM processes. Integrating rich spatial domain perspective information from the light field enhances quality assurance for AM manufacturing.

BRIEF DESCRIPTION OF THE DRAWINGS

To provide a clearer explanation of the technical solutions in the present disclosure or the prior art, the following will briefly introduce the figures required for the embodiments or descriptions of the existing technology. It is evident that the figures described below are examples of embodiments of the present disclosure. Ordinary skilled persons in the field can also obtain additional figures based on these figures without exerting creative labor.

DESCRIPTION OF THE EMBODIMENTS

To clarify the purpose, technical solutions, and advantages of the present disclosure, the embodiments described below, in conjunction with the accompanying drawings, provide a clear and complete description of the technical solutions of the present disclosure. It is evident that the described embodiments are part of the embodiments of the present disclosure. Ordinary skilled artisans in the art can obtain all other embodiments without inventive labor based on the embodiments of the present disclosure.

Addressing the deficiencies in the prior art, the present disclosure proposes a method for reconstructing the 3D contour of AM parts based on light field imaging to simplify processes of 3D contour reconstruction of AM part, thereby rapidly obtaining the 3D coordinate information of the contour surface.

Figure 1:
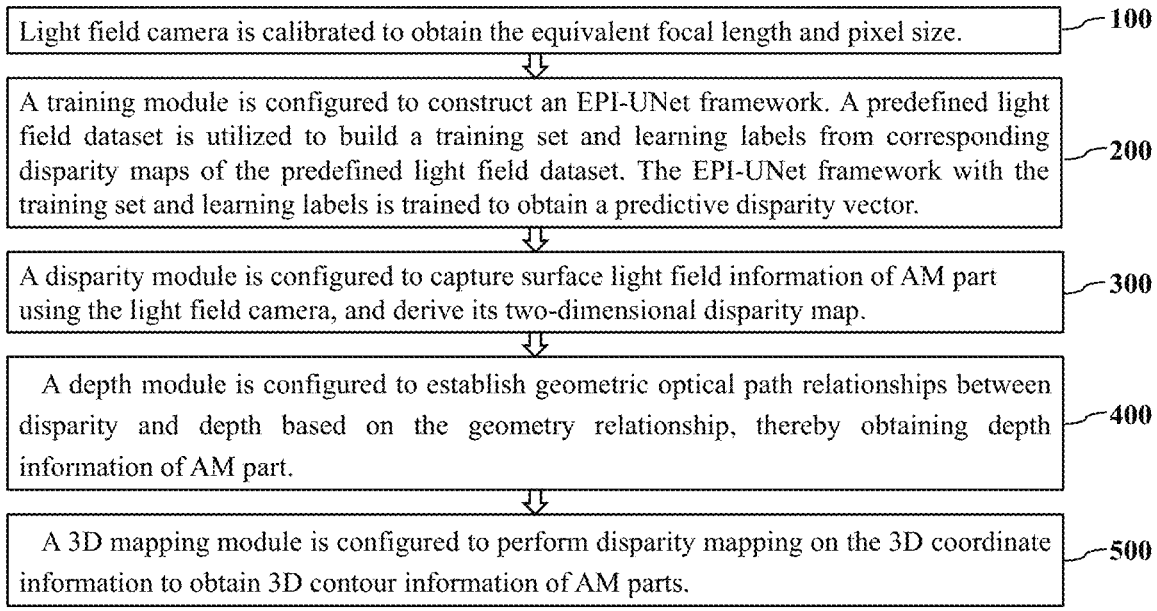
FIG. 1 illustrates one of the schematic flowcharts of the method for 3D contour reconstruction of AM parts based on light field imaging.

FIG. 1 illustrates one of the schematic flowcharts of the method for reconstructing the 3D contour of AM parts based on light field imaging provided by embodiments of the present disclosure, including:

Step 100: Calibrating the light field camera to determine the equivalent focal length and pixel size (the equivalent calibrated parameter set) of light field camera.

Step 200: Constructing the EPI-UNet framework, building a dataset using a preset light field dataset, obtaining learning labels from the disparity map corresponding to the preset light field dataset, using the training set and learning labels to train the EPI-UNet framework, and obtaining a predicted disparity vector model.

Step 300: Using the light field camera to capture light field information of AM part, obtaining its two-dimensional disparity map from the light field information of AM part. In the step 300, the light field information of an AM part surface of the target to be tested is captured using the light field camera, and its two-dimensional disparity map is obtained by inputting the light field information into the predicted disparity vector model.

The light field information of the AM part surface is sheared to obtain the LF-EPIs, and the LF-EPIs are inputted into the predicted disparity vector model to obtain multiple one-dimensional disparity vectors. LF-EPIs consist of numbers of lateral and vertical views, and each LF-EPI establishes a lateral and vertical two-dimensional coordinate system, and reciprocal of texture slope of a LF-EPI is equal to the one-dimensional disparity vectors. The multiple one-dimensional disparity vectors are sequentially spliced and combined to obtain the two-dimensional disparity map of the part.

Step 400: Based on the set of equivalent focal length and pixel size of the light field camera, determining the geometric optical path relationship between disparity and depth to obtain 3D coordinate information of the AM part.

Step 500: Mapping the 3D coordinate information of the target to be tested based on disparity mapping to obtain 3D contour information. In the step 500, disparity mapping is performed on the 3D coordinate information.

Specifically, in embodiments of the present disclosure, the camera is first calibrated to obtain the equivalent internal parameters of the light field camera. The HCl (Heidelberg Collaboratory for Image-processing) light field dataset is stacked in order to form a stereoscopic light field, the stereoscopic light field is sheared to obtain EPIs which are as the training set, learning labels are extracted from the corresponding disparity map, and the texture information of EPI is enhanced through CLAHE algorithm. The EPI-UNet framework is designed with a 5×5 convolutional kernels on the left side for extracting overall contour information of the target to be tested, a 3×3 convolutional kernels on the right side for extracting local detail information, and a 2×2 convolutional kernels for further extracting texture information. Additionally, a residual module is configured after each convolutional layer, which enhances the accuracy of extracting texture features of EPI images by combining previous information. According to the calibration parameters, 3D-coordinate information of the target to be tested through the geometric optical path relationship between disparity and depth is obtained. Finally, the light field images obtained from AM part are input into the trained network for disparity mapping, and obtain the true 3D contour information.

Figure 2:
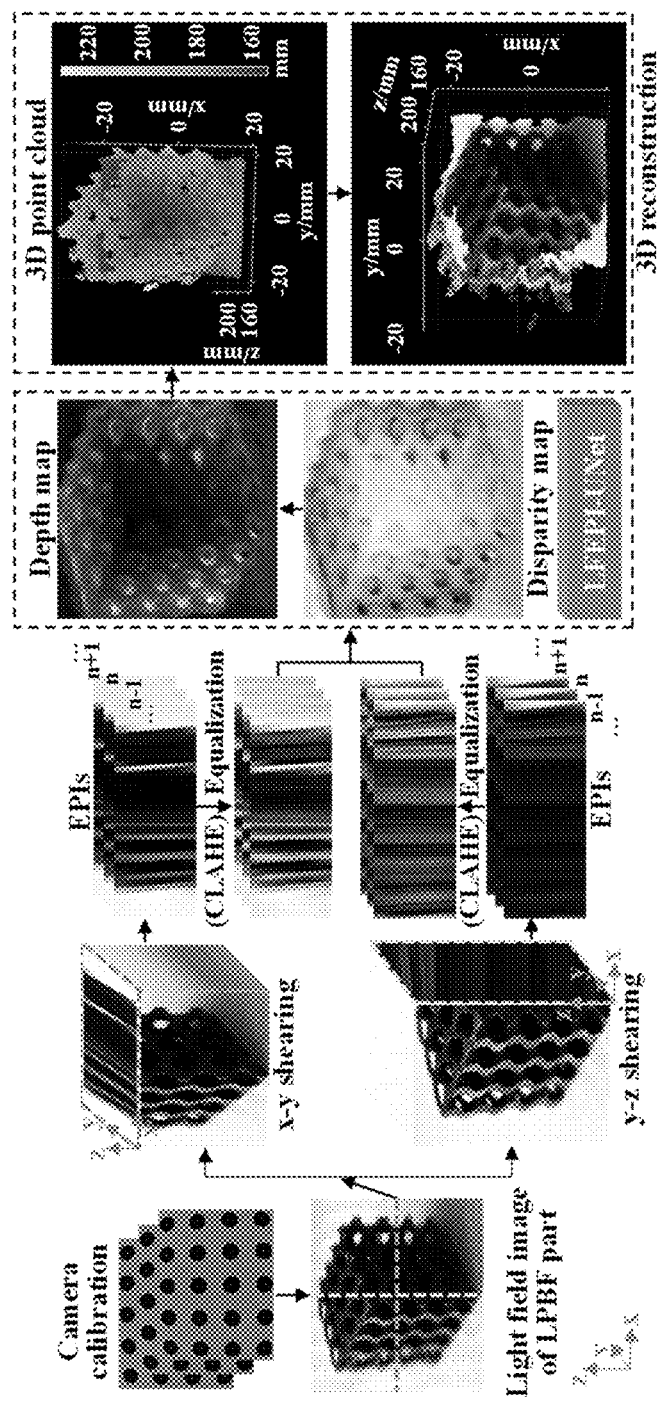
FIG. 2 illustrates schematic graph flowchart of the method for 3D contour reconstruction of AM parts based on light field imaging.

As shown in FIG. 2, the effective pixel of the light field camera is firstly calibrated. The method includes: capturing a standard circular calibration board from different viewpoints with a light field camera, extracting central sub-aperture images of the light field from each viewpoint, and obtaining the effective focal length and pixel values of the equivalent camera array. Then, sub-view images from the AM part are extracted sequentially for stacking, followed by horizontal (in x-y plane) and vertical (in y-z plane) shearing to obtain the LF-EPI which will be used for training. In the embodiments of the present disclosure, a light field scene can obtain a number of training images as N=u*s+v*t (u and v are the number of horizontal and vertical viewpoints, s and t are the number of pixels in the height and width directions of each viewpoint image). The LF-EPIs are input to the EPI-UNet network to obtain disparity map. According to the geometric relationship between 3D coordinate and disparity, the 3D surface information of the part is extracted.

The present disclosure enables rapid reconstruction of powder layer surfaces and part morphology in metal AM, facilitating visual and quantitative assessment for subsequent quality monitoring, thereby improving part quality.

In accordance with the embodiments described above, calibration of a light field camera involves determining a set of equivalent calibration parameters for the light field camera, comprising:

1. Capturing a standard circular calibration board from different viewpoints using the light field camera and extracting sub-aperture image of the light field from each viewpoint. The images of the standard circular calibration board from different viewpoints are captured with the light field camera and the light field central sub-aperture image for each of the viewpoints is extracted.

2. Obtaining effective focal lengths and pixel values of the equivalent camera array from the extracted sub-aperture images of the light field.

3. Specifically, due to the advantage of capturing multiple viewpoint images in a single shot, the light field camera can be equivalent to capturing multi-view images from multiple camera arrays. Calibration of the cameras enables determination of equivalent focal lengths and pixel values.

4. As shown in FIG. 2 of the present disclosure's embodiment, standard circular calibration boards are captured from different viewpoints using the light field camera, and sub-aperture images of the light field from each viewpoint are extracted to obtain effective focal lengths and pixel values of the equivalent camera array.

Based on the embodiments described above, a training set is constructed using a preset light field dataset, where learning labels are obtained from corresponding disparity maps in the preset light field dataset, including:

1. Extracting multiple sub-view images from the preset light field dataset and stacking these images to form a four-dimensional light field.

2. Performing horizontal and vertical shears on the four-dimensional light field and obtaining LF-EPI through grayscale conversion and CLAHE.

3. Partitioning multiple LF-EPIs from the preset light field dataset into training and testing sets based on predetermined proportions.

4. Extracting vectors from corresponding disparity maps in the preset light field dataset as learning labels.

The construction of the EPI-UNet framework includes:

1. EPI-UNet framework comprising sequentially connected contour feature extraction sub-networks, local feature extraction sub-networks, and detail feature extraction sub-networks is designed.

2. The contour feature extraction sub-network consists of 5×5×32 convolution kernels, residual modules, 5×5×64 convolution kernels, residual modules, and 5×5×64 convolution kernels.

3. The local feature extraction sub-network consists of 3×3×32 convolution kernels, residual modules, 3×3×64 convolution kernels, residual modules, and 3×3×64 convolution kernels.

4. The detail feature extraction sub-network consists of 2×2×32 convolution kernels, 2×2×16 convolution kernels, and 2×2×1 convolution kernels.

5. Using the training set and learning labels, training of the EPI-UNet framework results in a predicted disparity vector model, including:

(1) Inputting the training set into the EPI-UNet framework to obtain predicted disparity vectors.

(2) Calculating the difference between the predicted disparity vectors and the learning labels using a preset loss function.

(3) Performing backpropagation on the difference values. After completing one training cycle, inputting the testing set into the trained EPI-UNet framework for accuracy testing.

(4) Iteratively adjusting the hyperparameters of the EPI-UNet framework until the preset loss function is less than a loss threshold or the training iteration reaches a specified number of cycles, thereby stopping the training and outputting the predicted disparity vector model.

Figure 3:
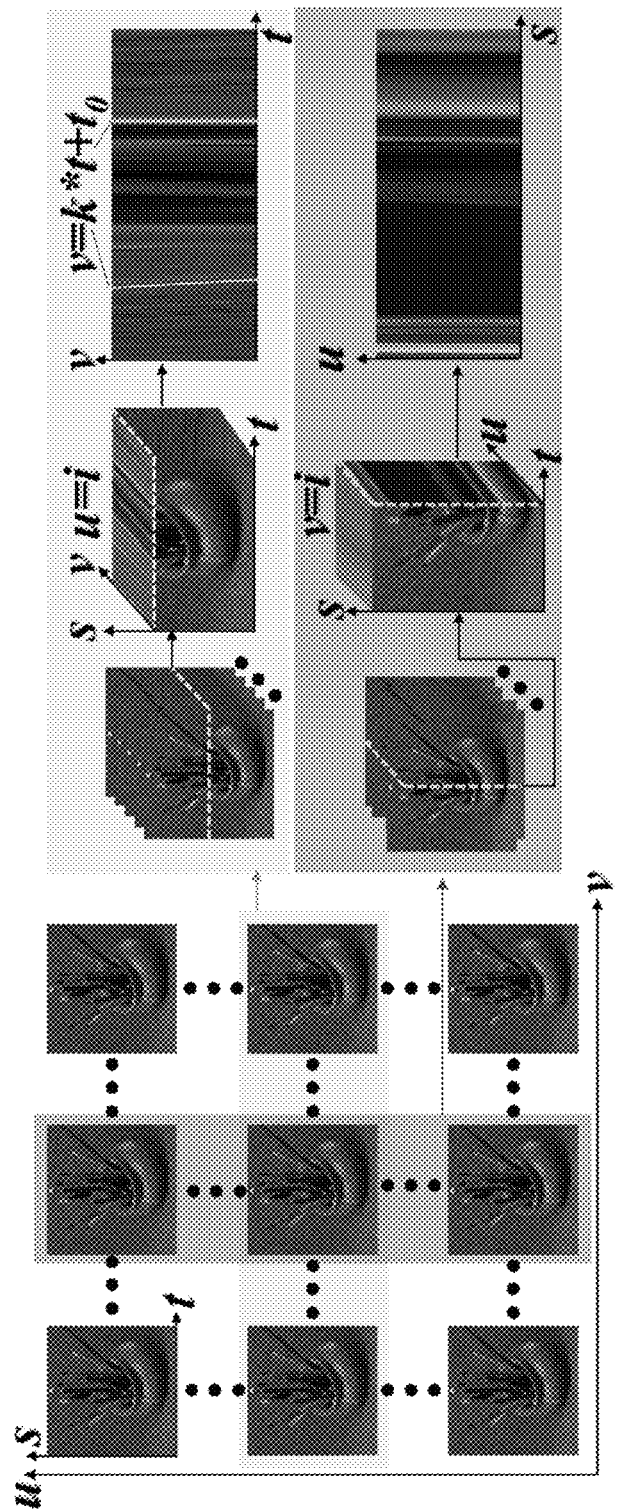
FIG. 3 depicts the process diagram for EPI extraction.

Specifically, in the embodiment of the present disclosure, the EPI-Unet network is constructed to obtain disparity information. Initially, image preprocessing involves obtaining multiple viewpoint sub-aperture images from the HCl dataset, selecting any n scenes for training and testing, and using the remaining scenes for validation. Subsequent steps include stacking multiple sub-aperture images of each training and testing scene to form a four-dimensional light field. Horizontal and vertical shears are applied to the four-dimensional light field to obtain LF-EPIs, which are then enhanced for texture detail features through grayscale conversion and CLAHE. Learning labels are obtained by extracting corresponding vectors from real disparity maps. As illustrated in FIG. 3, multiple viewpoint images of the light field are stacked to form a four-dimensional light field L (u, v, s, t). Orthogonal viewpoint images of the light field are selected for horizontal/vertical stacking to form a spatial light field, and shears in the horizontal/vertical directions yield light field EPIs L (v, t)/L (u, s).

Figure 4:
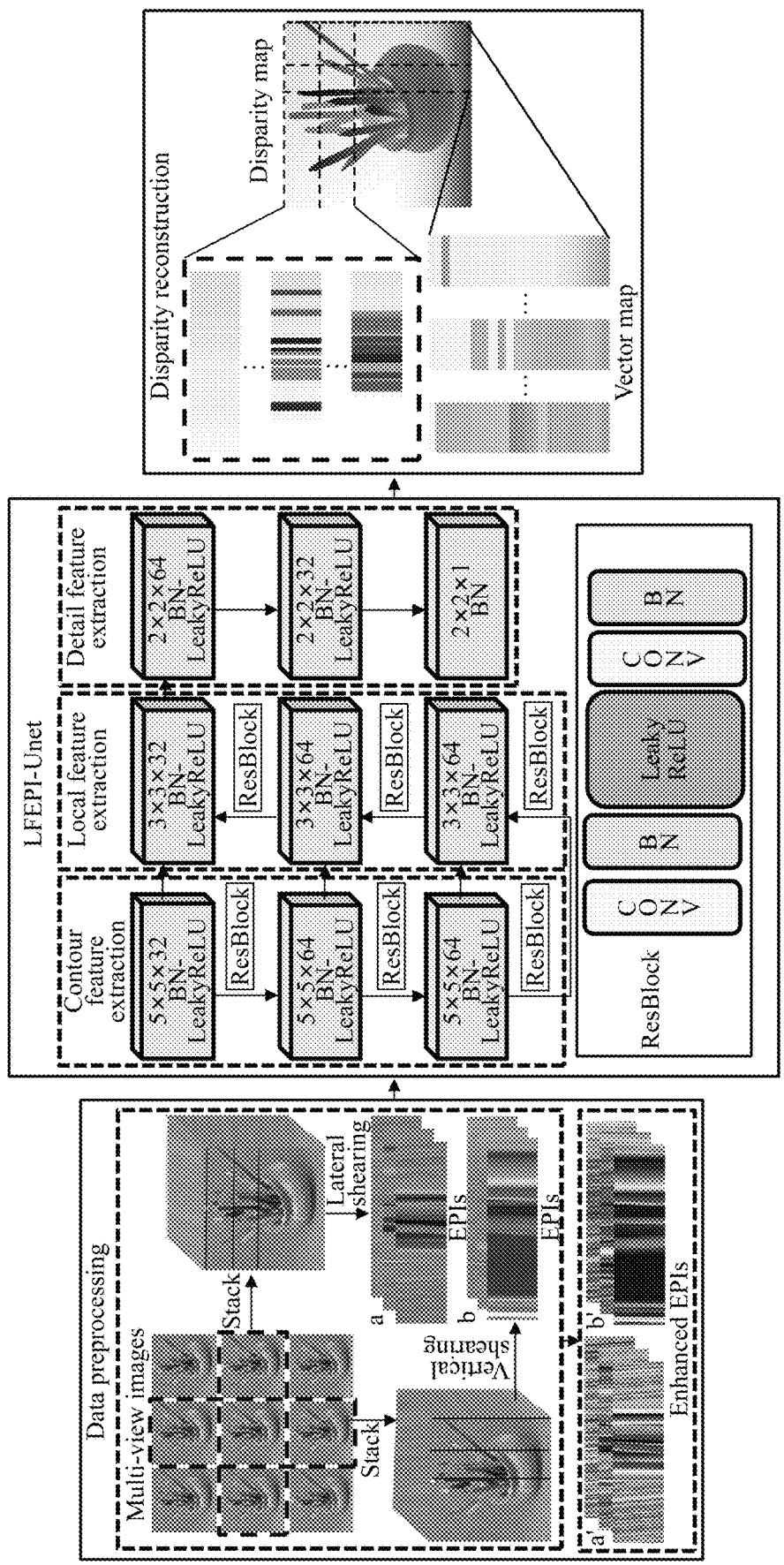
FIG. 4 illustrates the diagram of the EPI-UNet network.

The operational principle of the EPI-Unet network in the present embodiment, as shown in FIG. 4, involves processing horizontal and vertical LF-EPI through grayscale and CLAHE before inputting them into the EPI-UNet network. The network consists of three sets of 5×5, three sets of 3×3, and three sets of 2×2 convolution kernels. The 5×5 convolution kernels are used for extracting contour information from LF-EPI, the 3×3 convolution kernels for local features, and the 2×2 convolution kernels for reduce dimensionality vertically while further extracting texture information from LF-EPI. Each network layer includes residual modules to integrate image information before and after the image, accelerating network training speed and accuracy while enhancing disparity estimation performance.

Subsequently, image feature learning is conducted based on the EPI-UNet network, randomly partitioning multiple LF-EPIs from the dataset into predetermined proportions, such as 10% for testing and 90% for training. Training dataset images are inputted into the EPI-UNet network to obtain predicted disparity vectors. Backpropagation is performed based on the difference between predicted vectors and learning labels, where the difference is calculated using a loss function. After one training cycle, testing dataset images are inputted into the trained network to test network accuracy. These steps are iterated until the loss value is below a set threshold or the iteration reaches a specified threshold, at which point training is halted.

To simplify the training problem, the present disclosure's embodiment converts LF-EPIs from three channels to a single grayscale channel, preserving image information while reducing memory usage. Unlike conventional dataset augmentation methods like flipping or rotation, this approach involves horizontal and vertical cuts of a stereo light field comprising w×q viewpoints, each with n×p×m×p pixels, yielding w×n×p+q×m×p training samples for per scene. Thus, for HCl data, each scene can produce a number of 9216 training images.

Figure 5:
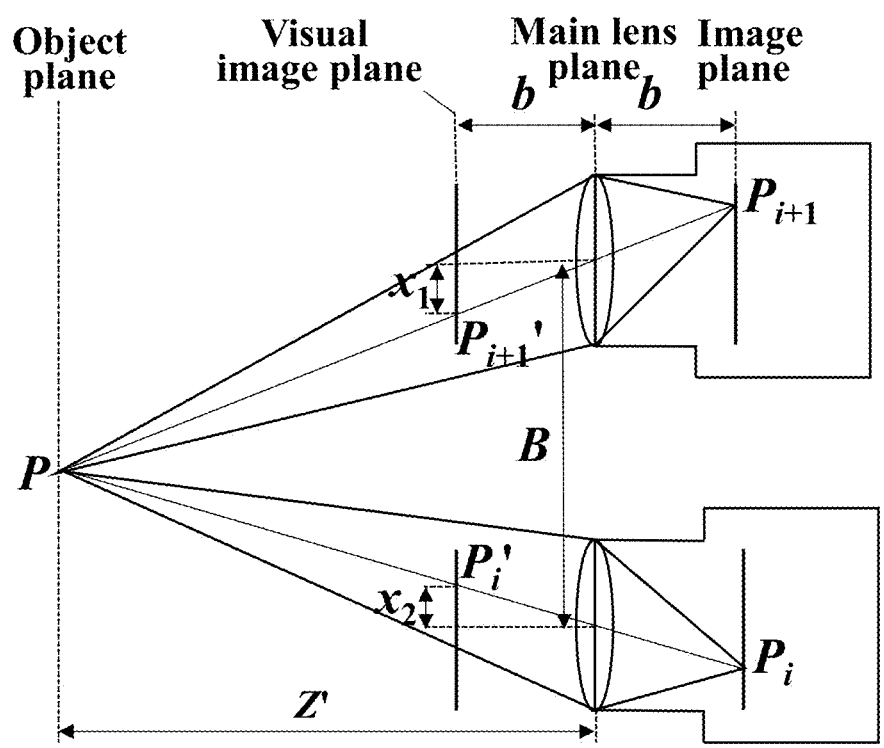
FIG. 5 shows the optical path diagram of imaging from adjacent dual-view cameras.

Based on the embodiments described above, using the calibrated parameters of the light field camera, the geometric optical path relationship between disparity and 3D is determined to obtain 3D coordinate information for the target to be tested. This process involves imaging paths between adjacent pairs of viewpoint cameras, as shown in FIG. 5, where P represents the focal position. For any point P on the target to be tested, imaging onto a sensor plane through main lens planes of any two adjacent views, with imaging points being $p_i$ and $p_{i+1}$. The paths from each camera image to the sensor plane (image plane) are denoted as $p_i$, $p_{i+1}$. Based on the reversible feature of light paths, connections are made between $p_i$, $p_{i+1}$, and their respective camera centers intersecting at point P. Segments $pp_i$, $pp_{i+1}$ intersect the image plane symmetrically about the main lens plane at points $p_i'$, $p_{i+1}'$. According to geometric relationships, it yields:

$$z' = \frac{B * b}{|x_1 - x_2|} \quad (1)$$

where z' represents the distance from the tested surface to the main lens plane, such as depth. B denotes the distance between the centers of any two adjacent views, $x_1$ and $x_2$ respectively represents the distance between any two adjacent central line. Let disparity be $\Delta x' = |x_1 - x_2|$, it can be gotten:

$$z' = \frac{B * b}{\Delta x'} \quad (2)$$

The main lens center is taken as the origin, with upwards as positive and downwards as negative. The formula $1/b + 1/z' = 1/F$ can be obtained with the camera focal length of F according to the Gaussian imaging. Substituting it into Eq. (2) gives:

$$z' - F = \frac{B * F}{\Delta x'} \quad (3)$$

Equation (3) represents the mapping relationship between disparity $\Delta x'$ and depth z', where $z' \to \infty$, if $\Delta x' \to 0$. Similarly, for the focused object plane conjugate to the image plane $1/b_0 + 1/z_0 = 1/F$:

$$z_0 = \frac{B * b_0}{\Delta x_0} \quad (4)$$

where $b_0$ is the distance from the main lens plane to the sensor plane.

Figure 6:
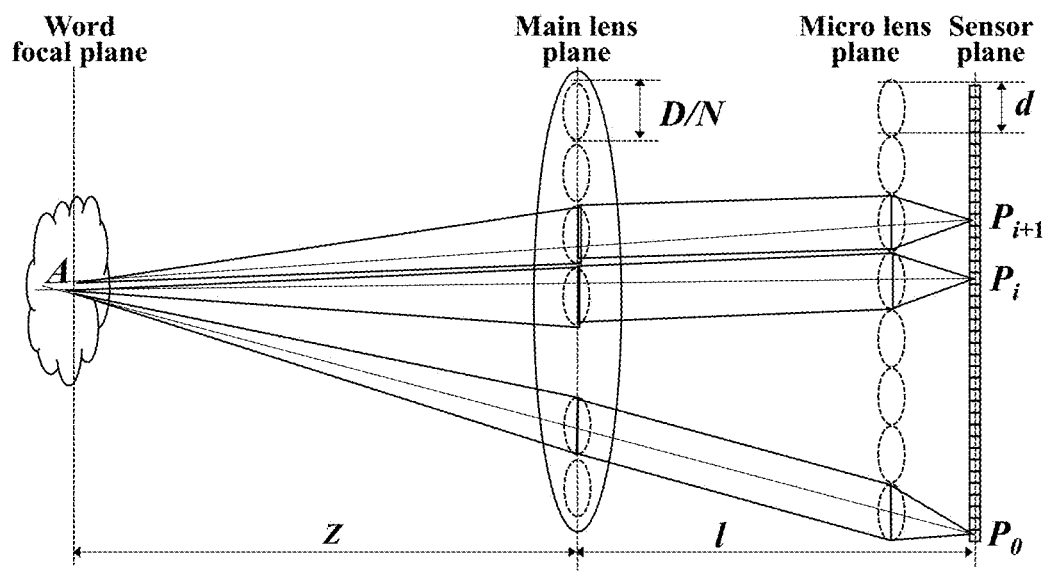
FIG. 6 explains the mapping between disparity and depth.

Similarly, as shown in FIG. 6, the light field depicts scene point P passing through the main lens and imaging to micro-lens, then secondarily imaging onto image sensor $p_0 \cdots p_i, p_{i+1} \cdots$, where dual-plane consist of main and micro lens record both spatial and angle information simultaneously. Let D be the aperture diameter of the main lens, and N×N be the number of light field views. Then, the spacing between each view is D/N. According to the geometric relationship, it can be gotten:

$$|p_{i+1} - p_i| = \frac{D * (z + l)}{N * z} \quad (5)$$

According to the Gaussian imaging formula: $1/l + 1/z_0 = 1/F$, where $z_0$ is the conjugate distance of l, and $|p_{i+1} - p_i|$ includes the offset $\Delta x_0$ between the disparity obtained by the light field camera and the disparity in its equivalent multi-camera array, the disparity $\Delta x$ of the light field can be derived:

$$\Delta x_0 = \frac{D * (z_0 + l)}{N * z_0} \quad (6)$$

$$\Delta x = |p_{i+1} - p_i| - \Delta x_0$$

$$\Delta x = \frac{D * l * \left|\frac{1}{z} - 1\right|}{N * z_0}$$

According to Eq. (6), it can be seen that the disparity is inversely proportional to the depth. When $z = z_0$, meaning it being in the initial focusing position, where $\Delta x = 0$. As shown in FIGS. 5 and 6, the disparity of is obtained by translating the disparity of the virtual camera to the corresponding focusing position. Therefore, disparity information can be obtained by obtaining the depth information z.

Figure 7:
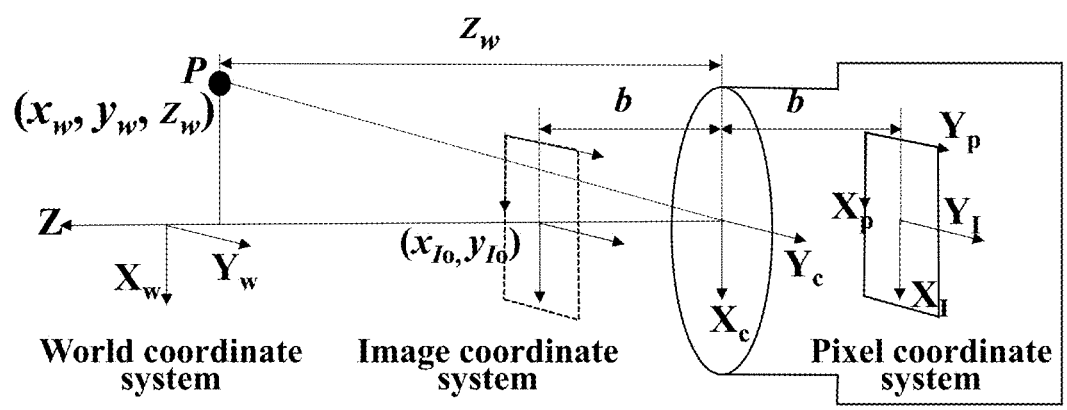
FIG. 7 depicts the diagram of 3D contour extraction.

Based on the above implementation, the mapping of disparity to the 3D coordinate information of the target object yields the 3D contour information. The imaging light path of the 3D spatial point P is shown in FIG. 7, where ($X_p$, $Y_p$) represents the pixel coordinate system, which. In a digital image, an image is constituted by an array of size m×n, with each value representing the intensity at that point. A Cartesian coordinate system ($X_p$, $Y_p$) can be established in the upper left corner of the image with pixels as units. ($X_I$, $Y_I$) denotes the image coordinate system with its origin located on the optical axis. Through this coordinate system, real physical units can be established to obtain the specific position of the object in 3D space, with its coordinate axes parallel to the pixel coordinate axes. Similarly, ($X_c$, $Y_c$, Z) and ($X_w$, $Y_w$, Z) represent the camera coordinate system and the world coordinate system, respectively, with the coordinate their axes' origins on the camera's optical axis. The projected coordinate axes in the Z direction are parallel to the image coordinate system. Combining $z' = B*b/\Delta x'$ and according to the geometry similarity, it can be derived:

$$\begin{cases} \dfrac{x_I - x_{Io}}{b} = \dfrac{x_w}{z_w} \\ \dfrac{y_I - y_{Io}}{b} = \dfrac{y_w}{z_w} \end{cases} \Rightarrow \begin{cases} x_w = \dfrac{x_I - x_{Io}}{b} z_w = \dfrac{x_I - x_{Io}}{\Delta x} * B \\ y_w = \dfrac{y_I - y_{Io}}{b} z_w = \dfrac{y_I - y_{Io}}{\Delta x} * B \end{cases} \quad (7)$$

where ($x_{Io}$, $y_{Io}$) represents the origin of the image coordinate system. Once the depth information or disparity information of a point in 3D space is obtained, the 3D coordinates of the object point can be determined using the camera parameters. The mapping relationship between any pixel on the image coordinate system and the pixel coordinate system is as follows:

$$\begin{cases} x_p = \dfrac{x_I}{dx} + x_{po} \\ y_p = \dfrac{y_I}{dy} + y_{po} \end{cases} \Rightarrow \begin{bmatrix} x_I \\ y_I \\ 1 \end{bmatrix} = \begin{bmatrix} \dfrac{1}{dx} & 0 & x_{po} \\ 0 & \dfrac{1}{dy} & y_{po} \\ 0 & 0 & 1 \end{bmatrix}^{-1} \begin{bmatrix} x_p \\ y_p \\ 1 \end{bmatrix} \quad (8)$$

where ($x_{po}$, $y_{po}$) denotes origin of the pixel coordinate system, dx and dy are the physical dimensions of a single pixel in the x and y directions, respectively. By combining Eq. (7) and (8), the 3D contour information of the target to be tested is obtained:

$$\begin{bmatrix} x_w \\ y_w \\ 0 \end{bmatrix} = \begin{cases} \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * B/\Delta x \\ \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * \left(\frac{z_w}{F} - 1\right) \end{cases} \quad (9)$$

According to mapping of the disparity-depth-3D coordinate, the 3D morphology of the powder layer and part during the AM manufacturing process can be quickly obtained, facilitating dynamic behavior monitoring of the AM process and improves metal processing quality.

This present disclosure first applies multi-view vision to the AM process, leveraging the rich spatial domain view information of the light field to provide a reliable quality assurance for AM monitoring.

The light field imaging-based 3D contour reconstruction system for AM parts provided by present disclosure is described as following. The system described below corresponds to the method of light field imaging-based 3D contour reconstruction of AM parts described above.

Figure 8:
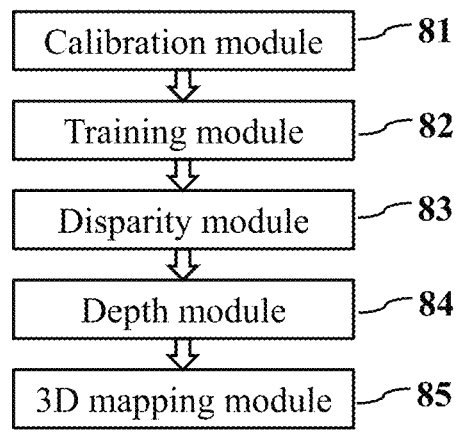
FIG. 8 illustrates the structural schematic diagram of the system for 3D contour reconstruction of AM parts based on light field imaging.

FIG. 8 is a schematic diagram of the structure of the light field imaging-based 3D contour reconstruction system for AM parts, including calibration module 81, a training module 82, a disparity module 83, a depth module 84, and a mapping module 85, wherein:

1. The calibration module 81 is used to calibrate the light field camera and determine the equivalent focal length and pixel of the light field camera.

2. The training module 82 is used to construct the EPI-UNet framework, where the preset light field dataset is utilized to construct a training set, learning labels from the disparity maps corresponding to the preset light field dataset are obtained, and the EPI-UNet framework is trained to obtain the predicted disparity vector model with the training set and learning labels.

3. The disparity module 83 is used to collect the angle and spatial information of the AM parts using the light field camera, and obtain the two-dimensional disparity maps of the scene.

4. The depth module 84 is used to determine the geometric light path relationship between disparity and depth based on the equivalent calibration parameter of the light field camera and obtain the depth coordinate information of the target to be tested.

5. The mapping module 85 is used to perform mapping between disparity and 3D coordinate information of the target to be tested to obtain the its 3D contour information.

Figure 9:
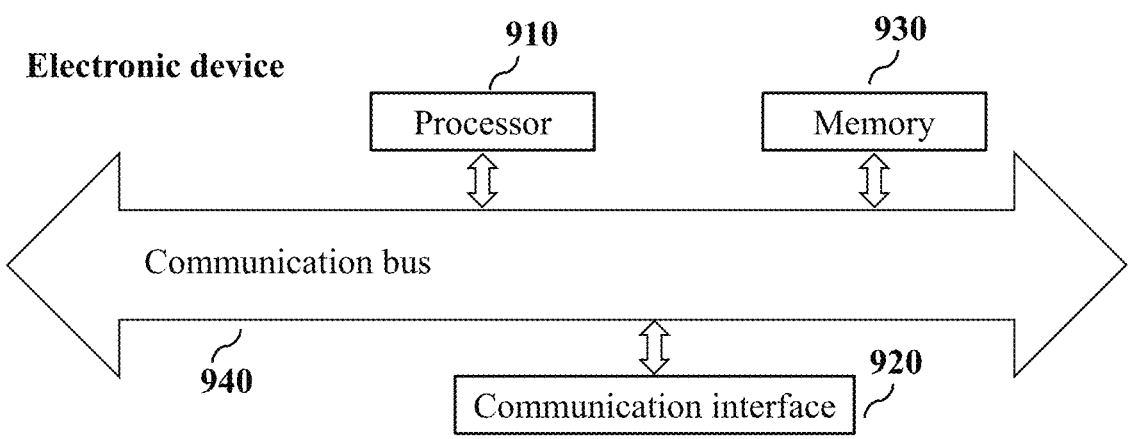
FIG. 9 shows the structural schematic diagram of the electronic device.

FIG. 9 illustrates a schematic diagram of the physical structure of an electronic device. The electronic device may include a processor 910, a communication interface 920, a memory 930, and a communication bus 940. The processor 910, communication interface 920, and memory 930 communicate with each other via the communication bus 940. The processor 910 can invoke logical instructions in the memory 930 to execute the method of light field imaging-based 3D contour reconstruction of AM parts. This method includes:

1. Calibrating the light field camera to determine the equivalent length and pixel size of the light field camera.

2. Constructing the EPI-UNet framework, utilizing the preset light field dataset to construct a training set, obtaining learning labels from the disparity maps corresponding to the preset light field dataset, and training the EPI-UNet framework with the training set and learning labels to obtain the predicted disparity vector.

3. Collecting the light field information of the AM part using the light field camera and obtaining the its two-dimensional disparity map.

4. Determining the geometric light path relationship between disparity and depth based on the equivalent calibrated parameters of the light field camera and obtaining the depth information of AM part.

5. Performing mapping between disparity and 3D coordinate of the to obtain the 3D contour information of the target to be tested.

Additionally, the logical instructions in the memory 930 can be implemented in the form of software functional units and, when sold or used as an independent product, can be stored in a computer-readable storage medium. Based on this understanding, the technical solutions of this disclosure can essentially be implemented as software products. The computer software product is stored in a storage medium and includes several instructions that enable a computer device (such as a personal computer, server, or network device) to execute all or part of the steps of the methods described in various embodiments of this disclosure. The aforementioned storage medium includes: USB drives, mobile hard disks, read-only memory (ROM), random access memory (RAM), magnetic disks, optical disks, and other media capable of storing program codes.

On the other hand, the present disclosure also provides a non-transitory computer-readable storage medium on which a computer program is stored. When executed by a processor, the computer program implements the method of light field imaging-based 3D contour reconstruction of AM parts, which includes:

1. Calibrating the light field camera to determine the equivalent length and pixel size of the light field camera.

2. Constructing the EPI-UNet framework, utilizing the preset light field dataset to construct a training set, obtaining learning labels from the disparity maps corresponding to the preset light field dataset, and training the EPI-UNet with the training set and learning labels to obtain the predicted disparity vector.

3. Collecting the light field information of the AM part using the light field camera and obtaining the its two-dimensional disparity map.

4. Determining the geometric light path relationship between disparity and depth based on the equivalent calibration parameters of the light field camera and obtaining the depth information of the target to be tested.

5. Performing mapping between disparity and 3D coordinate to obtain the 3D contour information of the target to be tested.

Figure 10A:
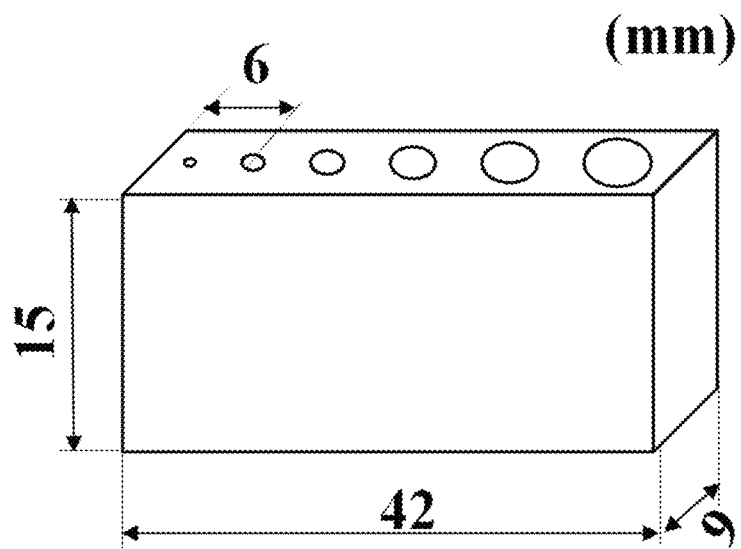
FIG. 10A to FIG. 10C display the accuracy of 3D contour reconstruction of AM parts based on light field imaging.
Figure 10B:
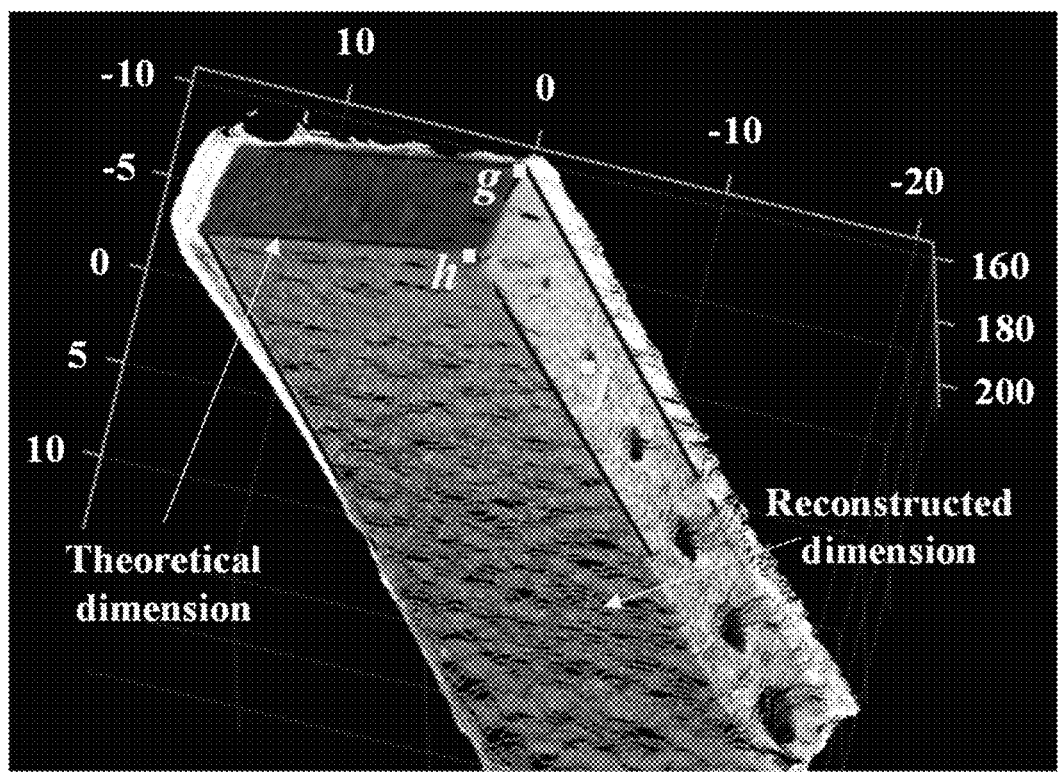
Figure 10C:
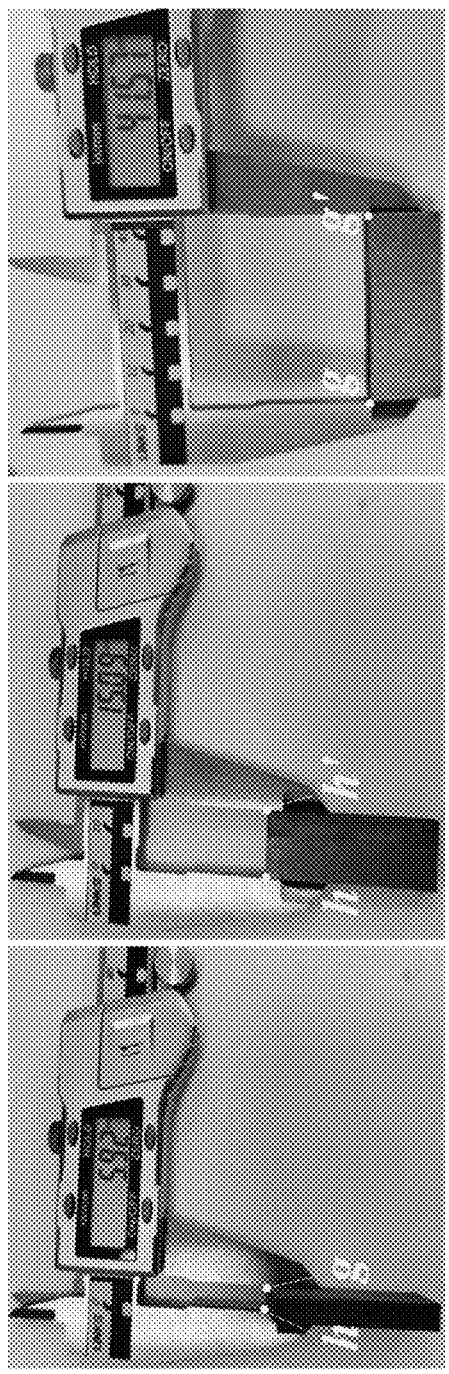
Figure 10C:
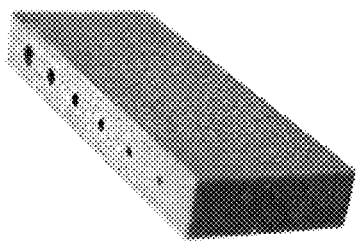

FIG. 10A to FIG. 10C display the accuracy of 3D contour reconstruction of AM parts based on light field imaging. In the AM manufacturing process, the contour accuracy of printed layer is crucial for ensuring the internal quality of the parts. In the present disclosure, an LF camera was used for in situ reconstructing 3D of the AM part illustrated in FIG. 10A, which was adhered to theoretical dimensions, featuring lengths, widths, and heights of 42 mm, 6 mm, and 15 mm, respectively. It included through-holes on the upper part, with adjacent holes spaced at a distance of 6 mm, as depicted in FIG. 10B. FIG. 10B shows reconstructed dimension by LF camera, where points g, g', h, h', and j were marked, while FIG. 10C presents the size of manufactured part measured by digital vernier caliper with error of 10 μm, where the points g, g', h, and h' corresponding to FIG. 10B were marked.

To assess the accuracy of the proposed method, a comprehensive analysis was conducted and presented in Table 1, which provided insights into the relative error of the dimension between the 3D contour points on the in situ reconstructed part. it can be obtained that the average relative and absolute errors of dimensions relative the manufactured were 0.38% and 86 μm, respectively, which means that the minimal metallurgical defect size detectable by proposed method is 86 m with the a 180 μm of camera resolution, and smaller defect size can be detected by the improved camera resolution.

TABLE 1

| 3D coordinates (mm) | Line | Theoretical (mm) | Manufactured (mm) | Reconstructed (mm) | Absolute error (mm) | Relative errors (%) |
|---|---|---|---|---|---|---|
| g (0.37, −10.26, 158.22) | gh | 6.00 | 5.92 | 5.95 | 0.03 | 0.50 |
| h (1.75, −4.71, 156.81) | hh' | 15.00 | 15.09 | 15.07 | 0.02 | 0.13 |
| h'(15.61, 5.49, 162.69) | gg' | 42.00 | 41.57 | 41.36 | 0.21 | 0.51 |
| g'(18.83, 6.84, 191.05) | | | | | | |
| | Average | | | | 0.086 | 0.38 |

Figure 11:
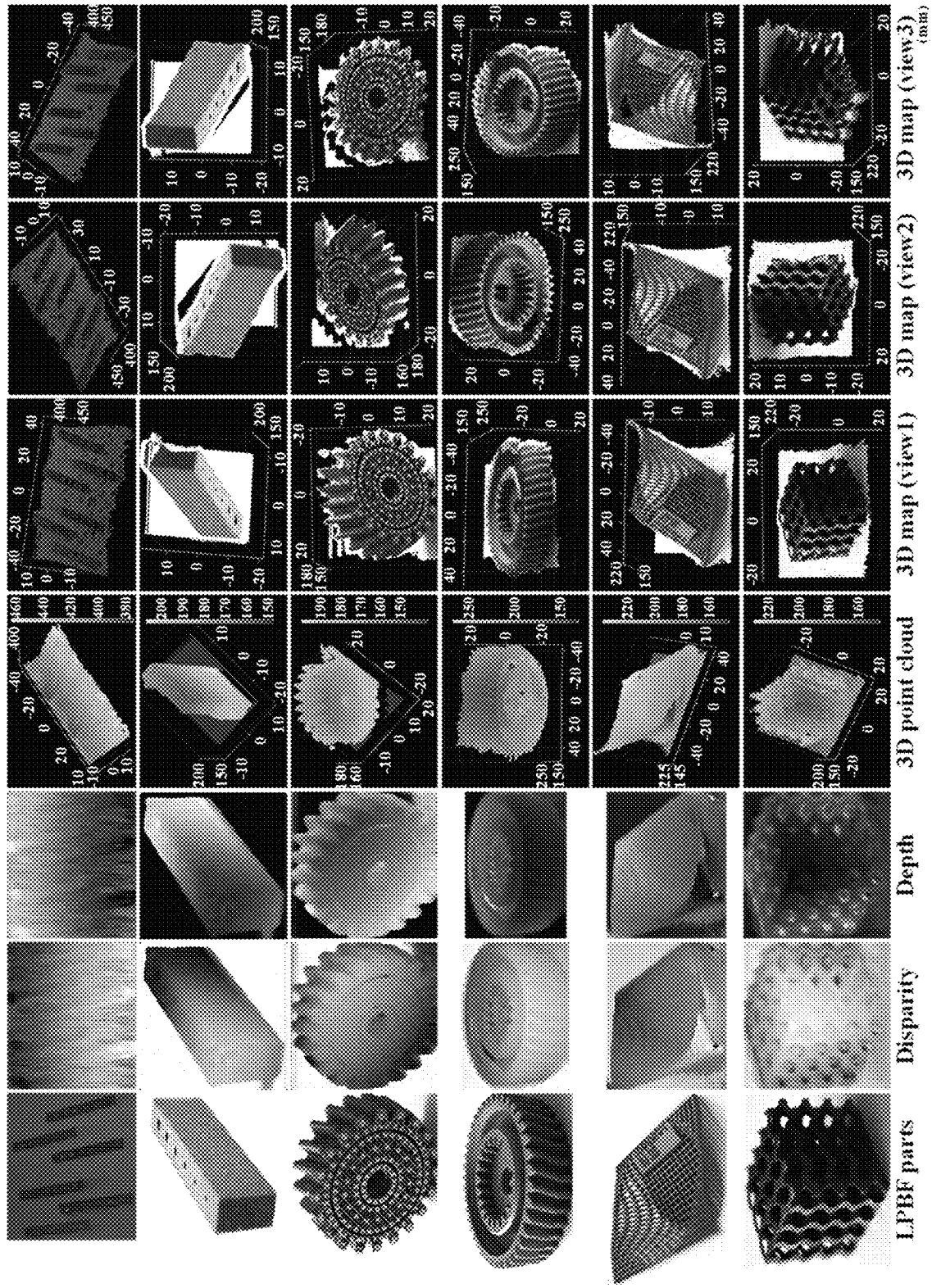
FIG. 11 shows the result of 3D contour of AM parts based on light field imaging.

FIG. 11 displays 3D contours of AM parts with complex geometries. The disparity map obtained from LFEPI-UNet was plotted in the second column, where lighter colors indicated larger disparities. The depth map derived from disparity mapping was displayed in the third column, with darker colors representing smaller depths. The reconstructed 3D point cloud with a color bar displaying the depth scale was illustrated in fourth column, obtained through depth, or disparity mapping. The reconstructed 3D contours of the LPBF parts were displayed from random perspectives in the last three columns. A challenge encountered during the reconstruction of the LPBF parts depicted in FIG. 11 indicated the presence of small holes, especially in the last four rows. However, the present disclosure successfully addressed this challenge by accurately reconstructing the detailed information of these holes while preserving the overall contour without distortion. Furthermore, the reconstructed contour information allowed for 3D contour visualization from multiple perspectives, which proved valuable for monitoring surface defects in the LPBF process and served as an essential reference.

The device embodiments described above are merely illustrative. The units described as separate parts may be either physically separate or integrated. Parts shown as units may be either physical units or integrated into one or multiple network units. Partial or all modules can be selected to implement the purposes of the embodiments of this disclosure as needed. A person of ordinary skill in the art can understand and implement the technical solutions described herein without creative effort.

From the above description of the embodiments, it can be clearly seen that the embodiments can be implemented by software combined with necessary general hardware platforms. It is also possible to implement them through hardware. Based on this understanding, the technical solutions of this disclosure can be embodied as software products, which can be stored in computer-readable storage media, such as ROM/RAM, magnetic disks, optical disks, etc., and include several instructions that enable a computer device (such as a personal computer, server, or network device) to execute all or part of the steps of the methods described in various embodiments of this disclosure.

Finally, it should be noted that the above embodiments are only intended to illustrate the technical solutions of this disclosure and not to limit them. Although this disclosure has been described in detail with reference to the aforementioned embodiments, a person of ordinary skill in the art should understand that they can still modify the technical solutions described in the aforementioned embodiments or replace some of the technical features with equivalent ones without departing from the spirit and scope of the technical solutions of each embodiment of this disclosure.

What is claimed is:

1. A method for 3D contour reconstruction of additive manufacturing (AM) parts based on light field imaging, characterized by comprising:

calibrating a light field camera to determine an equivalent calibrated parameter set of a light field camera;

constructing an epipolar-plane image-Unet (EPI-UNet) framework, using a preset light field dataset to construct a training set, obtaining learning labels from disparity maps corresponding to the preset light field dataset, and training the EPI-UNet framework with the training set and the learning labels to obtain a predicted disparity vector model;

capturing light field information of an AM part surface of a target to be tested using the light field camera, and obtaining a two-dimensional disparity map of a scene by inputting the light field information into the predicted disparity vector model;

determining geometric optical path relationship between disparity and depth based on the equivalent calibrated parameter set of the light field camera to obtain 3D coordinate information of the target to be tested;

performing disparity mapping on the 3D coordinate information of the target to be tested to obtain 3D contour information of the target to be tested, wherein constructing the EPI-UNet framework comprises:

determining the EPI-UNet framework that includes a contour feature extraction sub-network, a local feature extraction sub-network, and a detail feature extraction sub-network that are sequentially connected to each other, wherein the contour feature extraction sub-network consists of a 5×5×32 convolution kernel, a residual module, a 5×5×64 convolution kernel, a residual module, and a 5×5×64 convolution kernel, the local feature extraction sub-network consists of a 3×3×32 convolution kernel, a residual module, a 3×3×64 convolution kernel, a residual module, and a 3×3×64 convolution kernel, the detail feature extraction sub-network consists of a 2×2×32 convolution kernel, a 2×2×16 convolution kernel, and a 2×2×1 convolution kernel, wherein using the preset light field dataset to construct the training set, obtaining the learning labels from the disparity maps corresponding to the preset light field dataset comprises:

extracting a plurality of sub-view images from the preset light field dataset, stacking the sub-view images to form a four-dimensional light field volume;

shearing the four-dimensional light field volume horizontally and vertically, and obtaining a plurality of light field-EPIs (LF-EPIs) after gray scaling and performing a contrast-limited adaptive histogram equalization algorithm on the sheared four-dimensional light field volume;

dividing the LF-EPIs in the preset light field dataset into the training set and a testing set according to a preset ratio; and extracting vectors from a plurality of real disparity maps corresponding to the preset light field dataset as the learning labels, wherein training the EPI-UNet framework with the training set and the learning labels to obtain the predicted disparity vector model comprises:

inputting the training set into the EPI-UNet framework to obtain a plurality of predicted disparity vectors;

calculating difference between the predicted disparity vectors and the learning labels using a preset loss function;

performing backpropagation on the difference, and after completing one training cycle, inputting the testing set into the EPI-UNet framework which is trained for accuracy testing; and iteratively adjusting hyperparameters of the EPI-UNet framework to perform iteration training until the preset loss function is less than a loss threshold or a number of training iterations reaches a training iteration threshold, stopping training, and outputting the predicted disparity vector model.

2. The method for 3D contour reconstruction of AM parts based on light field imaging according to claim 1, wherein calibrating the light field camera to determine the equivalent calibrated parameter set of the light field camera comprises:

capturing images of a standard circular calibration board from different viewpoints with the light field camera and extracting a light field central sub-aperture image for each of the viewpoints;

obtaining an effective focal length and pixel values of an equivalent camera array from the light field central sub-aperture image.

3. The method for 3D contour reconstruction of AM parts based on light field imaging according to claim 1, wherein capturing the light field information of the AM part surface of the target to be tested using the light field camera, and obtaining the two-dimensional disparity map of the scene by inputting the light field information into the predicted disparity vector model comprises:

shearing the light field information of the AM part surface to obtain the LF-EPIs, and inputting the LF-EPIs into the predicted disparity vector model to obtain multiple one-dimensional disparity vectors;

the LF-EPIs consist of numbers of lateral and vertical views, and each LF-EPI establishes a lateral and vertical two-dimensional coordinate system, and reciprocal of texture slope of each LF-EPI is equal to the one-dimensional disparity vectors;

sequentially splicing the multiple one-dimensional disparity vectors and combining them to obtain the two-dimensional disparity map of the scene.

4. The method for 3D contour reconstruction of AM parts based on light field imaging according to claim 1, wherein determining geometric optical path relationship between disparity and depth based on the equivalent calibrated parameter set of the light field camera to obtain the 3D coordinate information of the target to be tested, comprising:

for any point P on the target to be tested, imaging onto a sensor plane through main lens planes of any two adjacent views, with imaging points being $p_i$ and $p_{i+1}$;

connecting P to $p_i$ and P to $p_{i+1}$, and intersecting with a symmetry plane of the sensor plane about the main lens planes at $p_i'$ and $p_{i+1}'$, respectively, that is derived:

$$z' = \frac{B*b}{|x_1 - x_2|} \quad (1)$$

where, z' represents a distance, which is a depth, between an object surface of the target to be tested and the main lens plane, B represents a central distance between any two adjacent views, and $x_1$ and $x_2$ respectively represent distances from central lines of any two adjacent views to an intersection line, wherein the disparity is set as $\Delta x'=|x_1-x_2|$, $$z' = \frac{B*b}{\Delta x'} \quad (2)$$

wherein a camera focal length is set as F, and according to a Gaussian imaging formula: $1/b+1/z'=1/F$, substituting it into Eq. (2):

$$z' - F = \frac{B*F}{\Delta x'} \quad (3)$$

wherein when $z' \to \infty$, $\Delta x' \to 0$, for a focused object plane conjugate to the sensor plane: $1/b_0+1/z_0=1/F$, $$z_0 = \frac{B*b_0}{\Delta x_0} \quad (4)$$

where $b_0$ represents a distance from the main lens plane to the sensor plane;

wherein when a main lens aperture diameter is D and a number of light field viewpoints is N×N, spacing between each viewpoint is D/N, and according to geometric relationships:

$$|p_{i+1} - p_i| \frac{D*(z+l)}{N*z} \quad (5)$$

wherein according to $1/l+1/z_0=1/F$, where $z_0$ is a conjugate distance of l, and $|p_{i+1}-p_i|$ includes an offset $\Delta x_0$ between the disparity obtained by the light field camera and the disparity in its equivalent multi-camera array, the disparity $\Delta x$ of the light field is derived:

$$\Delta x_0 = \frac{D*(z_0+l)}{N*z_0} \quad (6)$$
$$\Delta x = |p_{i+1}-p_i| - \Delta x_0$$
$$\Delta x = \frac{D*l*\left|\frac{1}{z}-1\right|}{N*z_0}$$

5. The method for 3D contour reconstruction of AM parts based on light field imaging according to claim 1, wherein performing disparity mapping on the 3D coordinate information of the target to be tested to obtain 3D contour information of the target to be tested comprises:
  determining a pixel coordinate system (Xp, Yp) and an image coordinate system (X$_I$, Y$_I$) based on any point P on the target to be tested, where axes of the image coordinate system are parallel to those of the pixel coordinate system;
  determining a camera coordinate system (Xc, Yc, Z) and a world coordinate system (Xw, Yw, Z) based on a coordinate origin of a camera optical axis, wherein projection coordinate axes in a Z direction of the camera coordinate system and the world coordinate system are parallel to that of the image coordinate system, according to Z'=B×b/Δx' and the geometry similarity, it is derived:

$$\begin{cases} \frac{x_I - x_{Io}}{b} = \frac{x_w}{z_w} \\ \frac{y_I - y_{Io}}{b} = \frac{y_w}{z_w} \end{cases} \Rightarrow \begin{cases} x_w = \frac{x_I - x_{Io}}{b} z_w = \frac{x_I - x_{Io}}{\Delta x} * B \\ y_w = \frac{y_I - y_{Io}}{b} z_w = \frac{y_I - y_{Io}}{\Delta x} * B \end{cases} \quad (7)$$

where ($x_{Io}$, $y_{Io}$) represents an origin of the image coordinate system, and a mapping relationship of any pixel between the image coordinate system and the pixel coordinate system is:

$$\begin{cases} x_p = \frac{x_I}{dx} + x_{po} \\ y_p = \frac{y_I}{dy} + y_{po} \end{cases} \Rightarrow \begin{bmatrix} x_I \\ y_I \\ 1 \end{bmatrix} = \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p \\ y_p \\ 1 \end{bmatrix} \quad (8)$$

where ($x_{po}$, $y_{po}$) is an origin of the pixel coordinate system, dx and dy are physical dimensions of a single pixel in x and y directions respectively, and Eq. (7) and Eq. (8) are combined to the 3D contour information of the target to be tested:

$$\begin{bmatrix} x_w \\ y_w \\ 0 \end{bmatrix} = \begin{cases} \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * B/\Delta x \\ \begin{bmatrix} \frac{1}{dx} & 0 & x_{po} \\ 0 & \frac{1}{dy} & y_{po} \\ 0 & 0 & 1 \end{bmatrix}^{-1} \begin{bmatrix} x_p - x_{po} \\ y_p - y_{po} \\ 0 \end{bmatrix} * \left(\frac{z_w}{F} - 1\right) \end{cases} \quad (9)$$

6. A system for 3D contour reconstruction of AM parts based on light field imaging, characterized by comprising:
  a calibration module, configured to calibrate a light field camera to determine an equivalent calibrated parameter set of a light field camera;
  a training module, configured to construct an EPI-UNet framework, use a preset light field dataset to construct a training set, obtain learning labels from disparity maps corresponding to the preset light field dataset, and train the EPI-UNet framework with the training set and the learning labels to obtain a predicted disparity vector model;
  a disparity module, configured to capture light field information of an AM part surface of a target to be tested using the light field camera, and obtain a two-dimensional disparity map of a scene by inputting the light field information into the predicted disparity vector model;
  a depth module, configured to determine geometric optical path relationship between disparity and depth based on the equivalent calibrated parameter set of the light field camera to obtain 3D coordinate information of the target to be tested;
  a mapping module, configured to perform disparity mapping on the 3D coordinate information of the target to be tested to obtain 3D contour information of the target to be tested;
  wherein constructing the EPI-UNet framework in the training module comprises:
    determining the EPI-UNet framework that includes a contour feature extraction sub-network, a local feature extraction sub-network, and a detail feature extraction sub-network that are sequentially connected to each other, wherein
    the contour feature extraction sub-network consists of a 5×5×32 convolution kernel, a residual module, a 5×5×64 convolution kernel, a residual module, and a 5×5×64 convolution kernel,
    the local feature extraction sub-network consists of a 3×3×32 convolution kernel, a residual module, a 3×3×64 convolution kernel, a residual module, and a 3×3×64 convolution kernel,
    the detail feature extraction sub-network consists of a 2×2×32 convolution kernel, a 2×2×16 convolution kernel, and a 2×2×1 convolution kernel,
  wherein using the preset light field dataset to construct the training set, obtaining the learning labels from the disparity maps corresponding to the preset light field dataset in the training module comprises:
    extracting a plurality of sub-view images from the preset light field dataset, stacking the sub-view images to form a four-dimensional light field volume;
    shearing the four-dimensional light field volume horizontally and vertically, and obtaining a plurality of light field-EPIs (LF-EPIs) after gray scaling and performing a contrast-limited adaptive histogram equalization algorithm on the sheared four-dimensional light field volume;
    dividing the LF-EPIs in the preset light field dataset into the training set and a testing set according to a preset ratio; and
    extracting vectors from a plurality of real disparity maps corresponding to the preset light field dataset as the learning labels,
  wherein training the EPI-UNet framework with the training set and the learning labels to obtain the predicted disparity vector model in the training module comprises:
    inputting the training set into the EPI-UNet framework to obtain a plurality of predicted disparity vectors;
    calculating difference between the predicted disparity vectors and the learning labels using a preset loss function;
    performing backpropagation on the difference, and after completing one training cycle, inputting the testing set into the EPI-UNet framework which is trained for accuracy testing; and iteratively adjusting hyperparameters of the EPI-UNet framework to perform iteration training until the preset loss function is less than a loss threshold or a number of training iterations reaches a training iteration threshold, stopping training, and outputting the predicted disparity vector model.

7. An electronic device, comprising a memory, a processor, and a computer program stored in the memory and executable on the processor, wherein the processor executes the computer program to implement the method for 3D contour reconstruction of AM parts based on light field imaging according to claim 1.

* * * * *